(12) United States Patent
Tuulos et al.

(10) Patent No.: US 7,626,932 B2
(45) Date of Patent: Dec. 1, 2009

(54) TRAFFIC CONTROL IN AN IP BASED NETWORK

(75) Inventors: Martti Tuulos, Tampere (FI);
Kari-Matti Varanki, Nokia (FI); Ove Strandberg, Lappböle (FI); Zhi-Chun Honkasalo, Kauniainen (FI); Erik Salo, Espop (FI); Jussi Ruutu, Espoo (FI); Pertti Paski, Tampere (FI); Vilho Räisänen, Helsinki (FI); Kari Niemelä, Oulu (FI); Ari Kynäslahti, Helsinki (FI)

(73) Assignee: Nokia Corporation, Espoo (FI)

( * ) Notice: Subject to any disclaimer, the term of this patent is extended or adjusted under 35 U.S.C. 154(b) by 657 days.

(21) Appl. No.: 10/499,002

(22) PCT Filed: Dec. 21, 2001

(86) PCT No.: PCT/EP01/15180

§ 371 (c)(1),
(2), (4) Date: Aug. 13, 2004

(87) PCT Pub. No.: WO03/055167

PCT Pub. Date: Jul. 3, 2003

(65) Prior Publication Data

US 2005/0122900 A1 Jun. 9, 2005

(51) Int. Cl.
*H04L 12/26* (2006.01)
(52) U.S. Cl. .................... 370/235; 370/230
(58) Field of Classification Search ......... 370/230–240, 370/255
See application file for complete search history.

(56) References Cited

U.S. PATENT DOCUMENTS

| | | | | |
|---|---|---|---|---|
| 4,905,233 A | * | 2/1990 | Cain et al. | 370/237 |
| 5,583,859 A | * | 12/1996 | Feldmeier | 370/471 |
| 6,137,777 A | * | 10/2000 | Vaid et al. | 370/230 |
| 6,363,253 B1 | * | 3/2002 | Valentine et al. | 455/445 |
| 6,901,065 B1 | * | 5/2005 | Ehrstedt et al. | 370/341 |
| 2002/0036983 A1 | * | 3/2002 | Widegren et al. | 370/230.1 |
| 2002/0049048 A1 | * | 4/2002 | Haberland | 455/403 |
| 2002/0071480 A1 | * | 6/2002 | Marjelund et al. | 375/141 |
| 2002/0078464 A1 | * | 6/2002 | Dravida et al. | 725/105 |
| 2002/0115460 A1 | * | 8/2002 | Rune et al. | 455/522 |
| 2002/0181394 A1 | * | 12/2002 | Partain et al. | 370/229 |
| 2003/0027595 A1 | * | 2/2003 | Ejzak | 455/560 |
| 2004/0037270 A1 | * | 2/2004 | Mercuriali et al. | 370/352 |

FOREIGN PATENT DOCUMENTS

WO WO 00/13093 3/2000
WO WO 00/72516 A1 11/2000

* cited by examiner

*Primary Examiner*—Kwang B Yao
*Assistant Examiner*—Andrew Lai
(74) *Attorney, Agent, or Firm*—Mintz, Levin, Cohn, Ferris, Glovsky, and Popeo, P.C.

(57) ABSTRACT

According to the present invention, traffic control in an IP based network is provided. For this purpose, traffic situation in the network is measured, and the traffic flow is controlled on the basis of the measured traffic situation. Moreover, an operator may define rules for different measured situations, and the traffic flow is controlled on the basis of these rules.

76 Claims, 7 Drawing Sheets

Inward interfaces of ITRM

Illustration of the outward interfaces of ITRM

Illustration of the interoperation of ITRM and IP bandwidth manager in IP RAN gateway-type elements An admission control example.

Example architecture for available bandwidth notification

TRAFFIC CONTROL IN AN IP BASED NETWORK

FIELD AND BACKGROUND OF THE INVENTION

The present invention relates to a method and a system for providing traffic control in an IP (Internet Protocol) based mobile network. In accordance with a more detailed aspect, the invention relates to All-IP RAN, in particular to IP Transport Manager interfaces in All-IP RAN.

Future mobile networks will increasingly be based on packet-based, in particular IP (Internet Protocol), technology in their transport. IP offers flexibility and savings for the operators in building fixed connections for several different purposes.

However, the IP packet based transport network is a challenge from the QoS (Quality of Service) point of view. Operators aim at achieving a high utilization rate of the low capacity transport links close to the base stations while at the same time maintaining the planned QoS and service differentiation levels so as to provide appropriate service at acceptable economic and equipment level.

If the traffic is allowed to flow to the IP transport of the mobile network freely like in the Internet, especially the thin, i.e. low-capacity or low-bandwidth transport parts close to the base stations may tend to become congested, resulting in very low quality of the user experienced QoS. The thin transport part is often based on radio links and copper instead of fiber which may then be available after this "last mile". This thin part is often the biggest part in volume because a mobile network usually is nation wide. However, in some cases, depending on operator's situation it is possible that the thin part occurs also in the very core of the network. Thin in this case means available transport bandwidth with respect to traffic volume.

SUMMARY OF THE INVENTION

It is an object of the present invention to solve or alleviate the above problems and to provide for a dynamic traffic control, preferably QoS control in an IP based network.

According to the present invention this object is achieved by a system according to the independent system claim and/or a method according to the independent method claim. Moreover, the invention provides a measuring device according to the independent measuring device claim, a control device according to the independent control device claim and a policy entity according to the independent policy entity claim.

According to the present invention accurate IP traffic data can be obtained and the traffic flow can be controlled on the basis of the traffic data using wireless mechanisms. Hence, there is no need for the use of signalling mechanisms such as RSVP.

Thus, feedback of IP transport network QoS situation is provided for connection admission control, in particular 3GPP connection admission control.

Information on the bandwidth on routes between gateways (GWs) and Base Transceiver Stations (BTS), that is between pairs of IP address ranges, may be presented to a control layer, preferably a 3GPP layer, so as to allow a call control, preferably a 3GPP call control, to verify that a new microflow of bandwidth X of Class Y can be admitted.

An IP RAN access network may therefore perform admission control based on QoS feedback from the network.

Further features and advantages of the present invention are defined in the following.

DETAILED DESCRIPTION OF PREFERRED EMBODIMENTS OF THE INVENTION

One of the ideas of the invention is to measure traffic situation, e.g. actual traffic situation in an IP based network, e.g. mobile network, and to use the measured data for controlling the incoming traffic flow.

The actual traffic situation may mean or include the traffic situations, topology, and traffic situation data.

Figure 1:
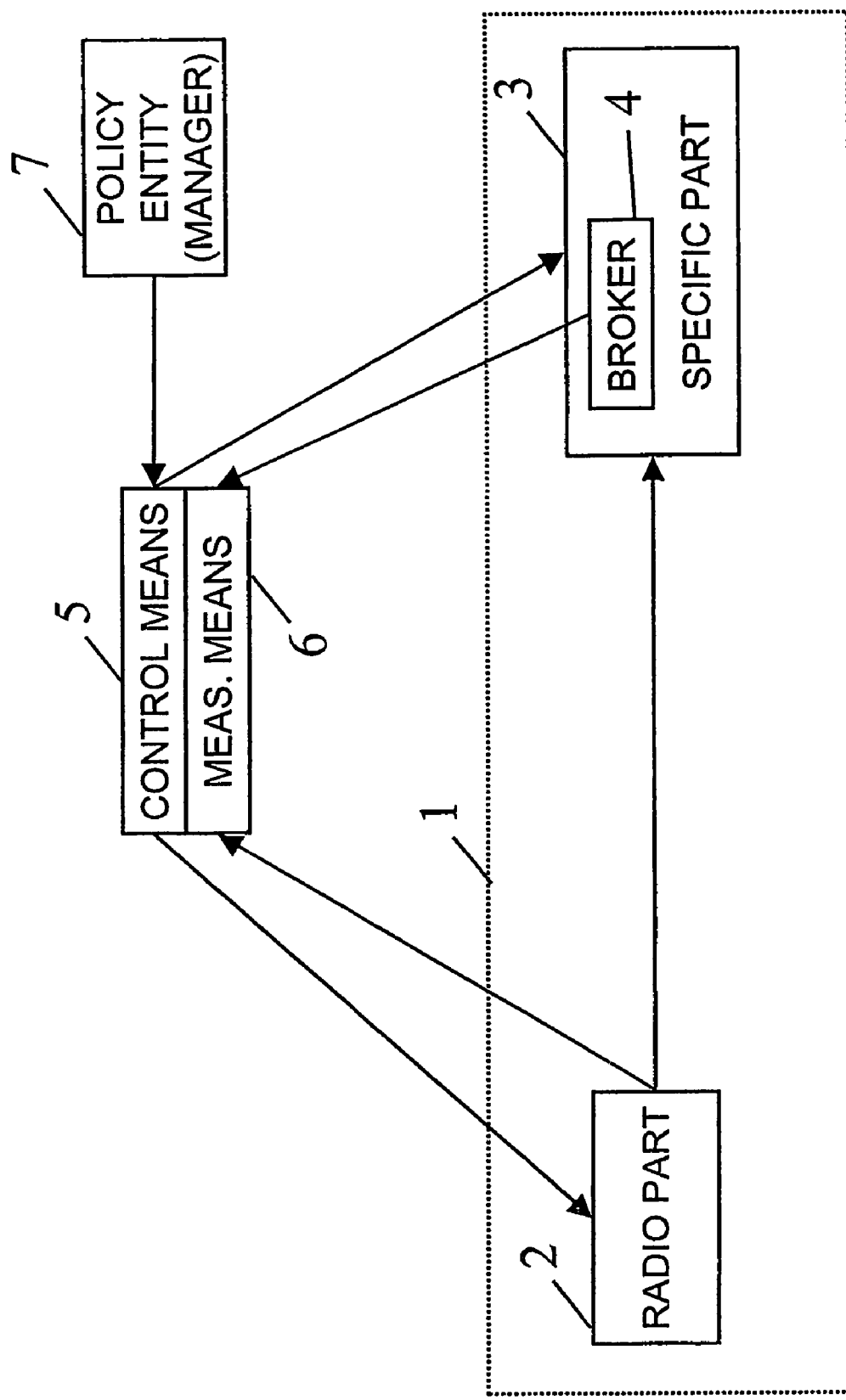
FIG. 1 shows a schematic block diagram illustrating the principle of the present invention.

In FIG. 1 measuring means 6 are shown which receive traffic data of (a part of) a mobile network 1, which is indicated by a block of dashed lines. Control means 5 shown in FIG. 1 in turn control incoming traffic flow on the basis of the measured traffic data.

The measured traffic data include information regarding the actual traffic load of the network 1, i.e. how many connections are present in the network, and may preferably additionally include information regarding the topology and routing of the mobile network 1, for example. This information can be combined to decide how many connections are allocated to certain specific parts of the network. The topology and routing information may be provided by a broker 4 in a specific part 3 of interest as shown in FIG. 1, such as an IP transport part or a core part of the network. The traffic load information may be provided by the radio part 2 of the network 1.

Moreover, actual traffic situation data within each routing domain of a specific part of the mobile network, such as the transport part can be derived from the measured traffic load on network elements and links and the topology and routing information, and then the means of the mobile network can be used to tune the incoming traffic on the basis of the measured actual traffic situation data.

According to FIG. 1, also a policy entity (or policy manager) 7 is provided. By means of the policy entity 7 the incoming traffic can be tuned to a level desired or set by an operator. This means that the operator can freely choose the QoS level he wants to offer to the subscribers, and at the same time control the utilization rate of the IP transport part of his network.

The control means 5 shown in FIG. 1 may perform incoming traffic flow control at the gateways of the mobile network 1 towards said specific part 3. The control means 5 may provide to each gateway an allowed amount of traffic and priorities to be set for the incoming traffic flow.

In accordance with an aspect of the invention, the two worlds of wireless and IP networks are combined. The invention as described above allows the operator a dynamic control of traffic in the IP transport network, based on the combination of actual traffic situation data as measured from the network and operator settable rules defining allowed network behaviour. Based on actual traffic data in the IP transport network, the system as shown in FIG. 1 is able to manage traffic flow into the transport network by controls used for the wireless layer.

The invention as described above is also applicable to the core part or other part of the mobile network. The invention is not limited to the radio edge, i.e. the radio access network side of a mobile network.

Figure 2:
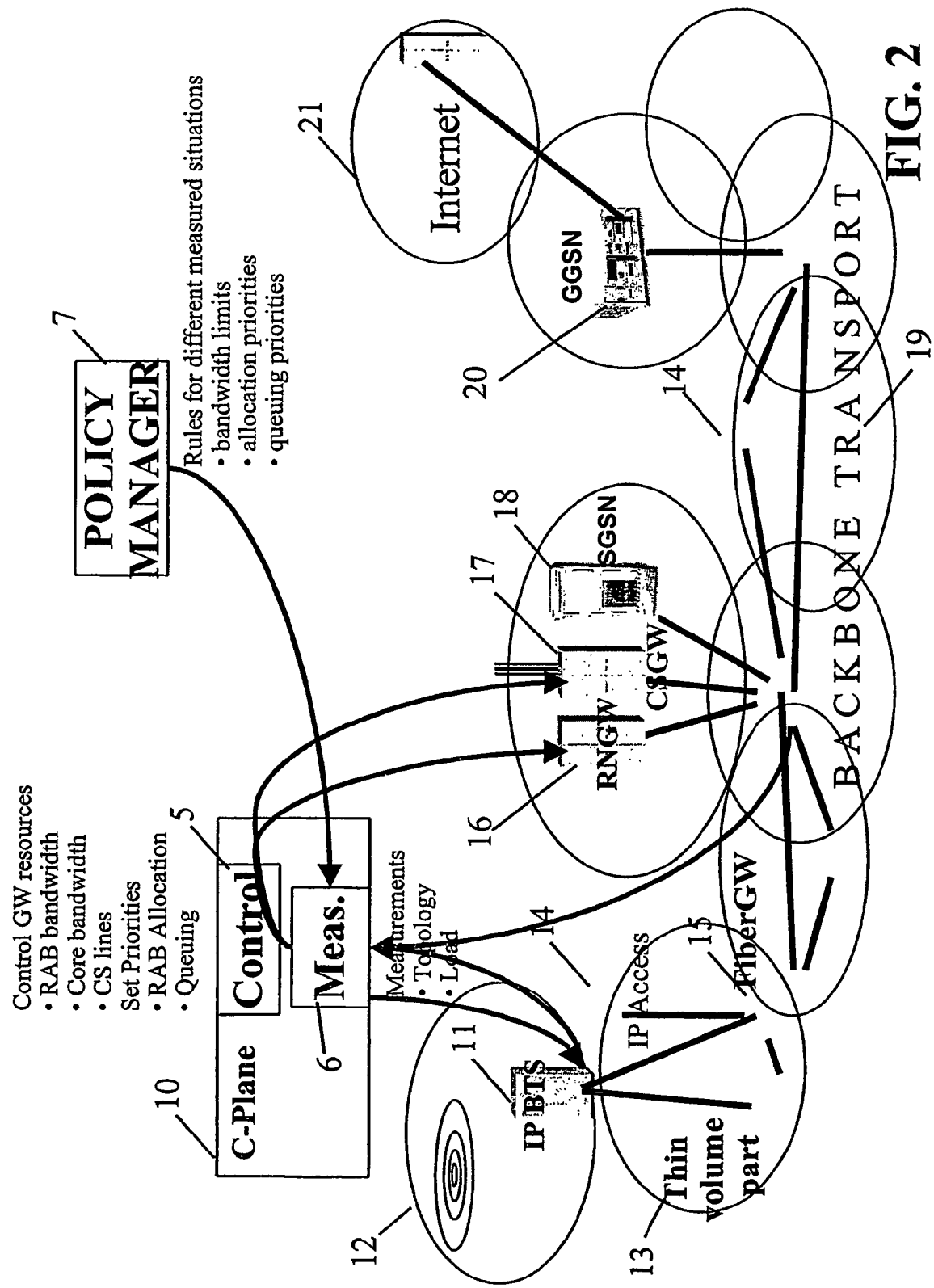
FIG. 2 shows a feedback loop for controlling incoming traffic flow towards a transport part of an IP based mobile network according to an embodiment of the present invention.

FIG. 2 shows a further embodiment of the present invention. As shown in FIG. 2, a feedback loop starts from IP transport measurements collected by measuring means (measurement part) 6 and ends at the traffic control performed by control means (control part) 5 of the mobile network through gateways (e.g. RNGW 16, CSGW 17) of the network. According to FIG. 2, the measurement part 6 and the control part 5 are located in a control plane 10 of the network.

The measurement part 6 collects load information from a radio part 12 of the network, i.e. from connections for IP access received by an IP BTS (Base Transceiver Station) 11. Moreover, the measurement part 6 collects topology information from a broker in the transport part, which receives data from RNGW (Radio Network Gateway) 16, a CSGW (Circuit Switched Gateway) 17 and an SGSN (Serving GPRS Support Node) 18. As shown in FIG. 2, between the radio part 12 and backbone transport part ("BACKBONE TRANSPORT") there is placed a thin volume part (of low transport capacity) 13 which may often end up being congested as described above. From the backbone transport part traffic data are supplied to a GGSN (Gateway GPRS Support Node) 20 and routed therefrom to the Internet 21.

Routers 14 shown in FIG. 2 provide the necessary routing functions and accesses. A fiber gateway 15 provides connection to a fiber for high-capacity fiber traffic transport.

In FIG. 2 also a policy manager 7 is provided in the mobile network, in which rules can be set for different measured situations. For example, such rules are bandwidth limits, allocation priorities and queuing priorities. Those rules can be set by an operator. The rules are provided to the measurement and control parts 5, 6 of the network and are used to perform control at the gateways of the network towards the transport part, such as the IP BTS, the RNGW and the CSGW. The control part 5 may control gateway resources and set priorities based on the measurements from the measurement part 6 in connection with the rules supplied from the policy manager 7. For example, the control part 5 controls the RAB (Radio Access Bearer) bandwidth, the core bandwidth, the CS (Circuit Switched) lines and sets priorities with respect to the RAB allocation and queuing.

The same functionality as described above can also be applied to the core part of the network although often the situation may be that the operator has sufficiently provided capacity for the core part of the network so that the core part can be managed with slower planning methods and no such dynamic feedback control is needed.

The measurement and control parts 5, 6 of the invention can be placed as software modules into the same running environment with other control plane functionalities of the mobile network and the traffic control can be done through the gateways so that the control plane 10 gives to each gateway the allowed amount of traffic and priorities to be set for different incoming traffic flows.

The embodiments of the invention described in the following refer, among others, to interfaces of IP Transport Manager, in particular IP Transport Resource Manager (ITRM), to network elements in IP RAN (IP-based Radio Access Network).

The invention provides solutions to the problem of relation of admission control of e.g. network elements, e.g. 3GPP (Third Generation Partnership Program) elements, to Quality of Service (QoS) in IP transport in RAN. The use of IP transport in RAN allows to achieve multiplexing gain, and the use of managed DiffServ (Differentiated Services) in IP transport routers in turn makes it possible to consistently. prioritize traffic types according to their delay and loss requirements.

The 3GPP layer here refers to Radio Network Layer protocols specified by 3GPP, including RANAP as well as RRC protocols. An interface between ITRM and "3GPP" layer (i.e. the RNL) is not part of 3GPP standard today.

Due to presence of $I_{UR}$ traffic in IP RAN, there can be variations in the volume of priority traffic. For this and other reasons, it is desirable to have a link between connection admission control and feedback from IP network QoS situation to simultaneously address, and comply with, network usage level and QoS requirements of critical traffic types.

The ITRM, e.g. as described and shown in the above and below described embodiments, provides a way of obtaining high-level view of QoS in IP RAN transport QoS, raising the abstraction level from single network elements to routes between elements.

In accordance with preferred embodiments of the invention, information on the bandwidth between pairs IP address ranges (IP host address ranges of GWs between BTS and GW site) is presented to the 3GPP layer, so that 3GPP call control can readily verify that a new microflow of bandwidth X of Class Y can be admitted.

The invention describes a method for providing feedback of IP transport network QoS situation for 3GPP connection admission control.

An advantage of using IP QoS feedback in admission control in accordance with embodiment of the invention is that utilization level of IP transport network links can be maintained at a higher level than would be possible without such a scheme.

The invention can e.g. be used in IP RAN access network for controlling admission control based on QoS feedback from network. In general, similar principle can also be used for more general admission control purposes.

The interface between 3GPP gateway-type elements and measurement modeller supports feedback to admission control based on IP QoS.

The invention can e.g. be used in IP RAN products.

In HSDPA (high speed downlink packet access) concept, a new MAC (Medium Access Control) entity, MAC -hs, has been defined to the network in order to support new capabilities. It is located in Node B. Due to this new entity a functional split between Node B and RNC has been reorganized. Upon this reorganization the scheduling/priority handling and the TFC (Traffic Flow Control) selection functions have been removed from SRNC to node B. However the current DCSH FP frame structure (DSCH FP=Downlink Shared Channel Frame Protocol) for Iub is not applicable for HSDPA data transmission, since there is unnecessary information, which assume TFC selection and scheduling performed. On the other hand DSCH FP frames lack information, which needs to be added in order to support flow control between RNC and node B. Thus, in accordance with preferred embodiments, the invention presents a new FP frame structure or data structure on data transmission on Iub.

Basically new fields are provided in order to guarantee that the flow control mechanisms work when e.g. the MAC entity MAC-hs is located in node B:

New fields are e.g: NumOfSDUs—this field is required to identify the number of the MAC—hSDUs in the frame and User Buffer size—this field is used to indicate the status of the buffer in RNC buffers (in bytes). This field informs the node B, how much data belonging to the same data flow is still left in RNC. The node B may use this information e.g. in scheduling so that data traffic having highest priority and highest amount of data in RNC buffer gets access to the HSDPA channel earlier than a flow which has low priority and a small amount of data.

Additionally the set of new field may contain UE Id type and a Common Transport Channel Priority Indicator (CmCH-PI).

If multiplexing is allowed a set of further fields is provided like

NumOfBuff—this field indicates how many RNC buffers data has been applied into this FP frame and finally Size of MAC SDU.

The structure of the needed frame may also depend on whether or not several mobiles can use one Iub tube (i.e. AAL2 connection).

As mentioned above, information on the bandwidth between pair IP address range (IP host addresses of GWs between BTS and GW site) is presented to the 3GPP layer, so that 3GPP call control can readily verify that a new microflow of bandwidth X of Class Y can be admitted.

The IP transport resource manager (ITRM) is responsible for dynamically updating this bandwidth information for the BTSs to use. However, there is no actual resource reservation as such inside the network for any given BTS and therefore such a method leads to maximum trunking gain (statistical multiplexing among BTSs). An advantage of this approach is that the complexity of the routed network is hidden from the 3GPP layer call control, and call control can readily take place with the bandwidth information presented to it locally for that BTS. In addition the method and system does not require the use of signalling mechanisms such as RSVP in the IP network. It is also possible to use the disclosed method to decrease processing requirements of ITRM.

The relevant interfaces are those related to connection admission control, and IP router functionalities in the network. These are described below.

The interfaces from which ITRM gains information are:
Router notification interface.
Topology monitoring interface.
SNMP polling interface.
Interface towards Radio Network admission control.
Interface towards Management system.

Figure 3:
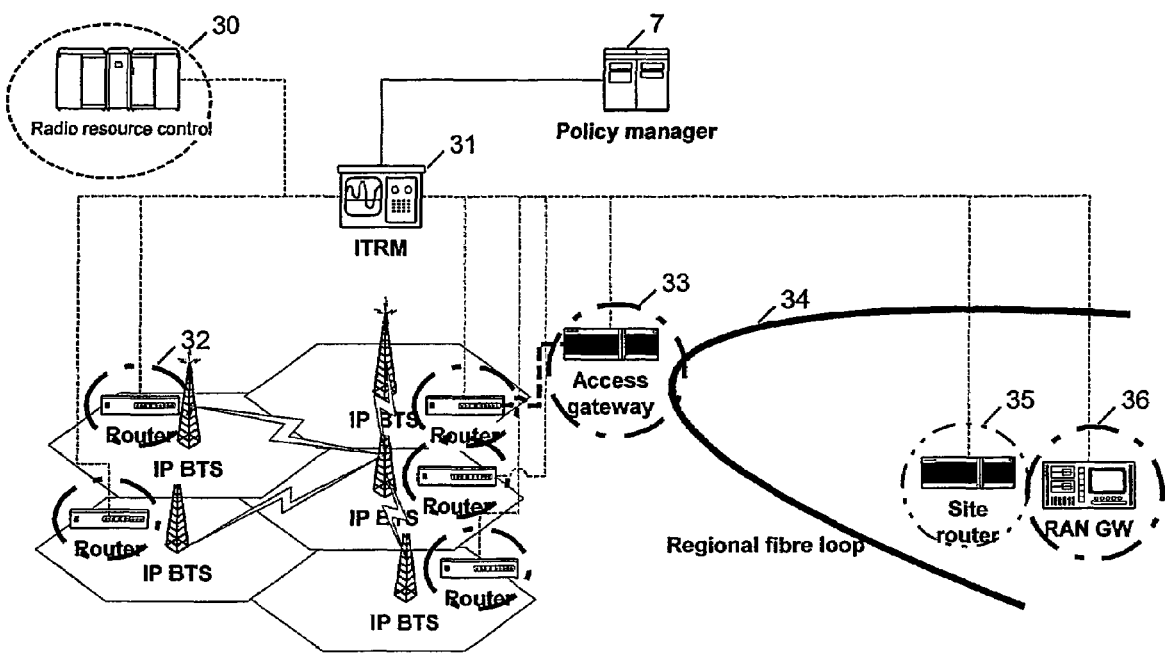
FIG. 3 shows inward interfaces of ITRM.

These input interfaces are illustrated in FIG. 3.

FIG. 3 shows several cells 32 each having an IP BTS and a router, an ITRM, a radio resource control 30, a policy manager 7, an access gateway 33, a site router 35, and a RAN GW 36. All these components are connected to, or communicate with, the ITRM 31, as represented by the dotted lines. In FIG. 3, those interfaces where both router notification and SNMP polling interfaces are available, are represented by dot-and-dash lines. These interfaces are in particular present in the routers close to the IP BTSs, in the Access gateway (GW) 33, and in the RAN GW 36. The site router 35 interface where only SNMP polling can be assumed is encircled by a dot-and-dash line with two dots each. The backbone between the Access gateway and the site router as well as the RAN GW is formed by a regional fibre loop 34.

Figure 4:
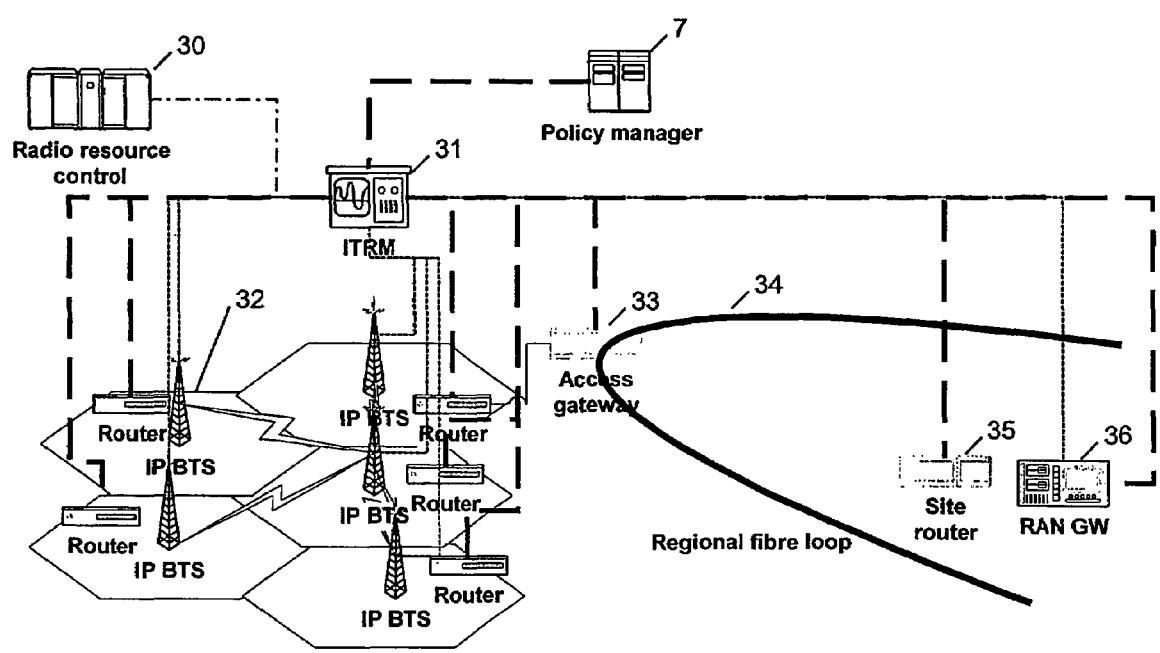
FIG. 4 illustrates outward interfaces of ITRM.

The outward interfaces from ITRM 31 are as follows:
Interface for configuring DiffServ and MPLS PIBs in IP elements. The same interface can be used for elements of different vendors/providers,
Interface for providing information for connection admission control. This interface is towards gateway-type elements such as IP BTS and RAN GW 36,
Interface for providing notifications of QoS status changes in IP Transport,
Interface towards to management system, FIG. 4 illustrates the same basic structure and topology of the networks and entities as in FIG. 3, and shows the outward interfaces of ITRM 31. IP and MPLS (Multi Protocol Label Switching) configuration interfaces (between ITRM and BTSs, RAN GW) are drawn in dotted lines, admission control interfaces (between ITRM 31, Policy manager 7, cell routers, site routers 35, and access gateway 33) in dashed lines, and QoS notification interface (between ITRM 31 and Radio resource control 30) in dot-and-dash line.

The ITRM 31 uses appropriate data processing algorithms for information processing.

In accordance with an aspect of preferred embodiments of the invention, the invention relates to the second outward interface listed above, i.e. the admission control interface. The details of that admission control interface are described below.

Figure 5:
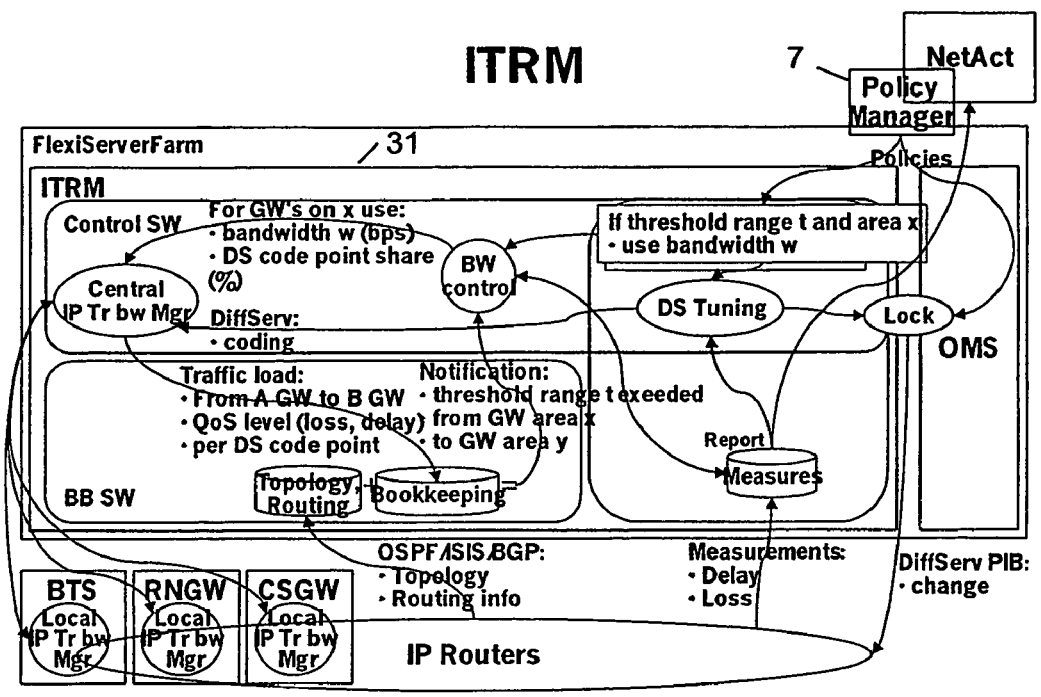
FIG. 5 is illustrating the interoperation of ITRM and IP bandwidth manager in IP RAN gateway-type elements.

The general framework of admission control is illustrated in FIG. 5. FIG. 5 shows a schematic drawing illustrating the interoperation of ITRM 31 and IP bandwidth manager in IP RAN gateway-type elements.

The ITRM shown in FIG. 5 comprises a Control software (SW) module having a Central IP Transport Bandwidth Manager (IP Tr bw Mgr) a bandwidth control element or function, a Differentiated Services (DS or DiffServ) Tuning element or function, and a report storage element or function. The ITRM shown in FIG. 5 further comprises a Baseband software module (BB SW) having Topology, Routing and Bookkeeping elements or functions.

Further, FIG. 5 shows one of the BTSs, a RNGW (RAN Gateway), a CSGW (Circuit-Switched Gateway), each including a Local IP Transport Bandwidth Manager (IP Tr bw Mgr), IP Routers, an Operation and Administration (Maintenance) System OMS, the Policy Manager, and the interaction and message flows between these components. The message flows are represented by arrows, single-headed arrows symbolizing unidirectional flow, and double-headed arrows symbolizing bidirectional flow.

The Central IP Transport Bandwidth Manager (IP Tr bw Mgr) and the local IP Transport Bandwidth Managers (IP Tr bw Mgr) bi-directionally commmunicate with each other, as shown by the drawing. The IP routers send information, e.g. OSPF/ISIS/BGP, on Topology, and Routing info, to the Topology and Routing elements or functions, which forwards the information to the Bookkeeping element or function. The IP routers further send measurement information on measured delay and loss to the measurements reports storage.

The Bookkeeping element or function further receives, from the Central IP Transport Bandwidth Manager (IP Tr bw Mgr), traffic load information, per traffic aggregate, e.g. per DSCP (DS code point): "Traffic load from each monitored gateway to other monitored GWs, e.g. from A GW to B GW", "QoS level (loss, delay)", and sends, to the BW Control, a notification: "threshold range t exceeded from GW area x to GW area y" when the traffic between some gateways should have exceeded a given threshold range t.

The BW Control further receives from the measurements report storage information on the measured values, and sends to the Control SW information on the bandwidth (in bits per second, bps) to be used for the gateways, and on code point sharing "For GW's on x use: bandwidth w (bps), DS code point share (%)".

The measurements reports storage sends measurement information to the DS Tuning element and to the Policy Manager. The Policy Manager defines the target values of the bandwidth to be used depending on set threshold range t and area x to be served by an element, e.g. gateway, or network, and informs the BW Control on these set target values. The Policy Manager further controls, via OMS, a lock function which may interact with the IP routers by sending information "DiffServ PIB: change".

The DS Tuning element informs the Control SW on "Diff-Serv: coding".

The method and system illustrated in FIG. 5 and described above preferably apply to at least the control of Conversational class traffic at Iu'-PS, Iur traffic, and all Iu'-CS traffic, all of which are mapped to the EF (Expedited Forwarding) class in the IP transport network. The scheme applies to the lower part of transport network (MWR access), in between RNGW/CSGW and IP BTS.

Although the signaling procedure example is given for RAB establishment, the same working principle can also be used for serving BSGW relocation and Inter-BTS HO (Hand-Off).

Figure 9:
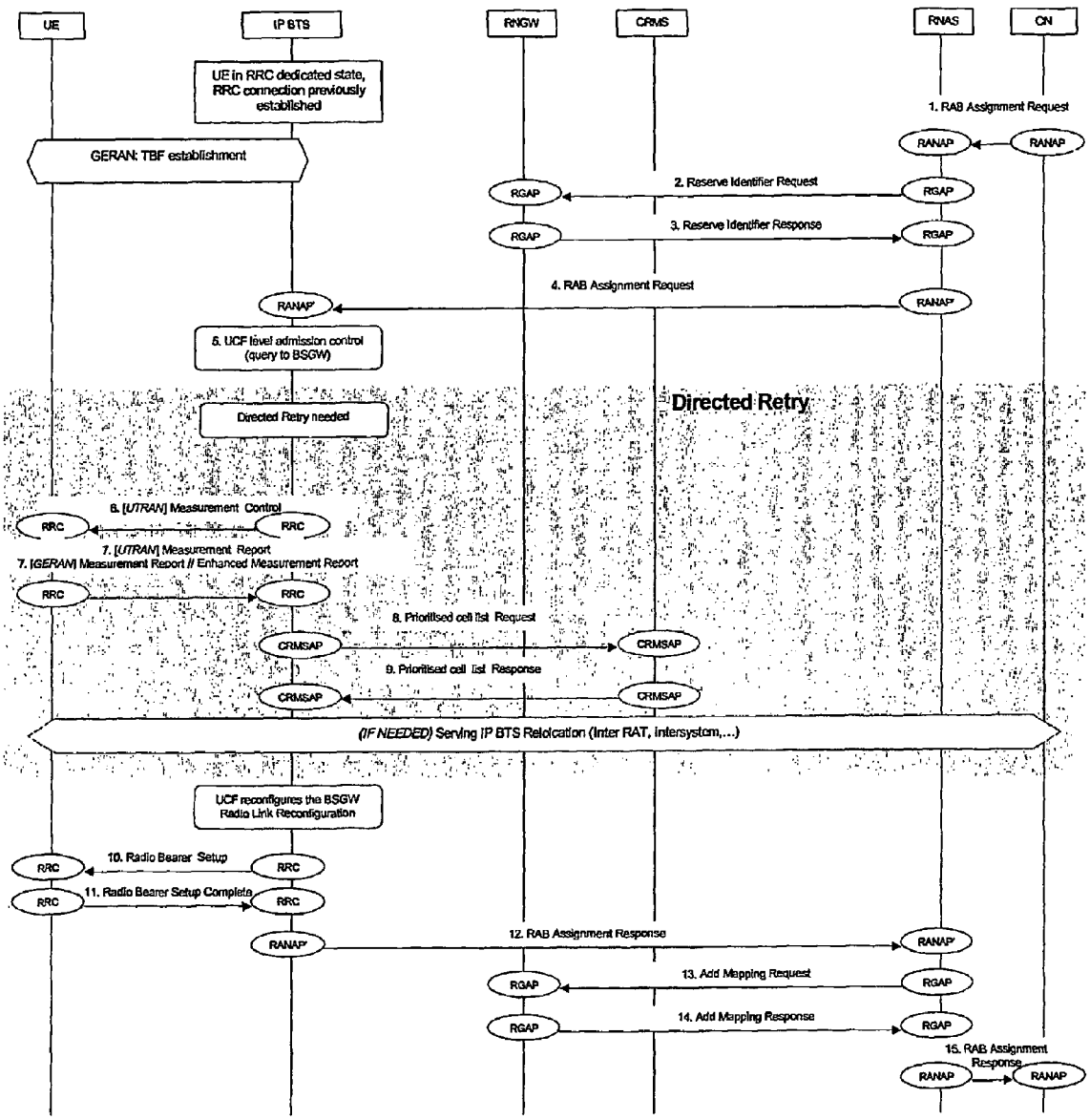
FIG. 9 shows information flow between a UE and nodes in an embodiment in accordance with the invention.

The complete Radio Access Bearer assignment procedure for 3GPP is described and shown in FIG. 9.

Some of the key issues in isolated or arbitrarily combined form are:

Checking the availability of IP transport resource should take place as part of Step 5 of FIG. 9, at the time when the location of serving IP BTS and controlling BTS are determined (here both Endpoints of Iu'/Iur tunnel are known).

In the case direct or directed re-try is initiated during RAB establishment, the procedure for serving IP BTS relocation should be followed. If serving BTS and drift BTS are different physical BTSs, then the link capacity of both Iur tunnel and Iu' tunnel should be checked at the same time.

It is not critical where the BSGW selection function physically locates in the IP RAN architecture, the only consideration being that the available logical interface bandwidth must be checked by that function before activating the tunnel. The details of BSGW selection function can be found in [LMDC].

In the following, the ITRM functionality will be described in more detail.

The IP Transport Resource Manager (ITRM) is a logical element of All-IP RAN that is responsible for monitoring topology and loading status of IP transport. A proposed interface description is listed above. For the present purposes, it is sufficient to say that the preferred solution is that QoS feedback from network elements may be based on polling for loading information in the routers or on alarms triggered by per-traffic class loading situation in the routers. Based on the knowledge of topology and loading, ITRM is able to aid 3GPP layer in IP QoS related issues in connection admission control decisions and relocation procedures on per-3GPP traffic class basis. The most scalable solution is not to do IP resource checking for each connection but rather handle aggregates of individual flows.

It is assumed here that there are multiple ITRMs in the network, each responsible for an IP transport region. Such a region can span multiple routing domains. A general schematic about hierarchy of ITRMs is shown in FIG. 6 showing a proposed solution.

Figure 6:
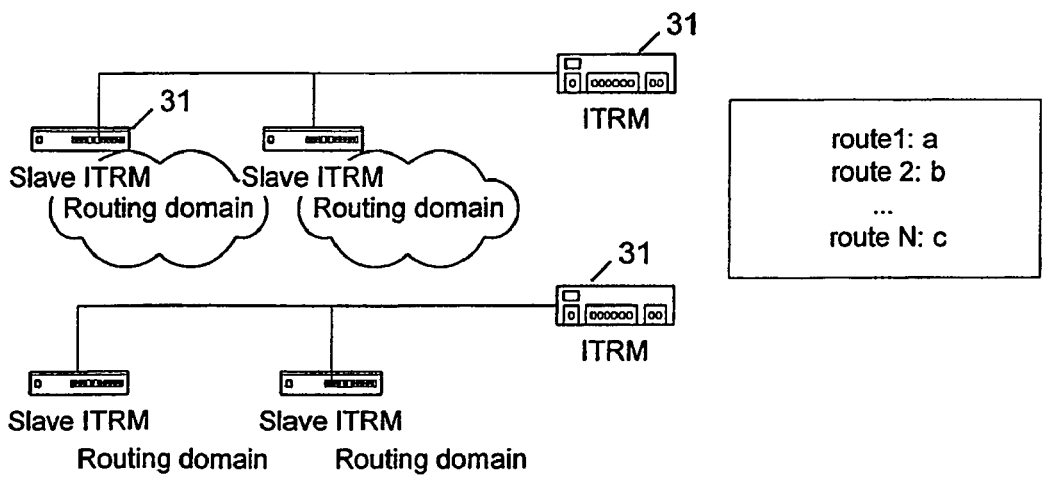
FIG. 6 shows an embodiment comprising several ITRMs which provide admission control interface information that can be used by 3GPP connection admission control.

In the embodiment of FIG. 6, each routing domain has a Slave ITRM 31, with several slave ITRMs being subordinated to a (master) ITRM 31, as shown. ITRMs 31 provide admission control interface information that can be used by 3GPP connection admission control. Additionally, ITRM provides information to 3GPP connection control on available IP transport resources, such as available bandwidth. These are explained in more detail below.

Admission control interface information is updated based on information of ongoing connections (provided by 3GPP call control) as well as measurements from the routers.

As regards Congestion status information, the format information in the interface is preferably such that a lookup pertaining to QoS situation between two IP address ranges can be made. The IP address range in the IP BTS end represents the IP host adresses in a router interface of the BTS. The determination of the actual IP addresses may be made at the 3GPP call control side of the interface or at the ITRM side of the interface.

When setting up a radio network layer connection e.g. a radio access bearer, the 3GPP call control can use ITRM-supplied information on available IP transport resources of logical interfaces between the corresponding IP BTSs and RAN GWs (and CSGWS).

By available transport resources it is referred here to the information that call control, in particular 3GPP call control, can associate with the needed IP transport resources. For example, the information can be expressed in terms of bandwidth (e.g. kbit/s) and/or required delays and/or packet losses and/or predetermined class information and/or indications (see subsequent explanations to IP transport resource information). Available IP transport resource information should be provided so that 3GPP call control can readily decide whether a new microflow of bandwidth X of Class Y can be admitted. The class corresponds to a traffic aggregate, for example, to the Diffserv class in the IP transport network being identifed by a pre-defined Diffserv codepoint (or DSCPs).

In the most common scenario there is only one logical RNGW. In such case the Iu' IP transport resource information for every IP BTS may contain the IP transport resource of conversational class, including both Iu'-PS and Iu'-CS, for the whole IP BTS.

If there are more than one logical RNGW (e.g. physically located in different Core sites), the available IP transport resource information will be provided for each of the existing Iu' logical interfaces for each IP BTS.

An example of this is given below. A connection (tunnel) needs to be setup between BTSs A, B, and RAN GW (Endpoint C). The user is in Cell under BTS A, and BSGW is proposed to be in BTS B. The user needs connection of 30kbps for Iur between BTS A and B, and 60kbps of Conversational class for Iu' between BTS B and RAN GW (C).

Figure 7:
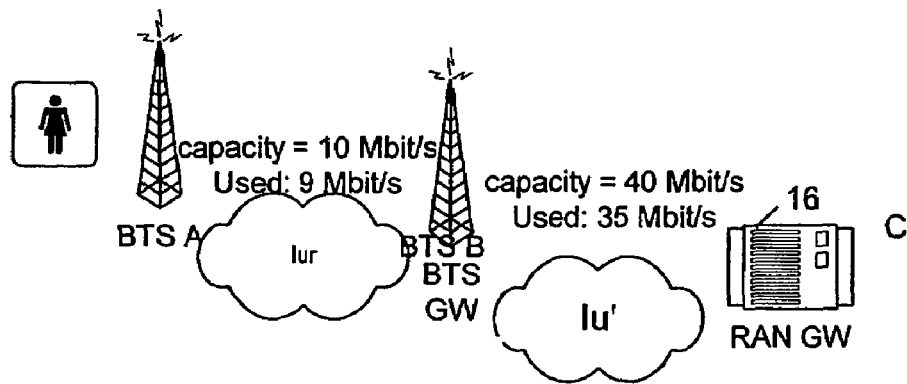
FIG. 7 illustrates a further embodiment for providing admission control.

The interface capacities and utilization levels are as shown in FIG. 7 (let us say that this is the direction for downlink direction and that uplink is not a problem). The admission control procedure now checks the information about available bandwidth, which contains the following information:

| A→B | Iur      | 8 Mbit/s  | B→A | Iur      | 1 Mbit/s |
| --- | -------- | --------- | --- | -------- | -------- |
| B→C | Conv. Iu'| 20 Mbit/s | C→B | Conv. Iu'| 5 Mbit/s |

This information can be provided per traffic type. Based on this information, 3GPP connection admission control knows that there are enough IP resources for admitting the new connection.

FIG. 7 shows two base transceiver stations-BTS A, BTS B communicating via Iur interface. The BTS A provides connection to a subscriber as shown in the drawing, and has a capacity of 10 Mbit/s, with 9 Mbit/s being actually used. The BTS B provides connection to a RAN GW 36 via interface Iu' as shown in the drawing, and has a capacity of 40 Mbit/s, with 35 Mbit/s being actually used.

The information in the interface is updated by ITRMs 31 based on two sources:

Traffic report from BSGWs, RNGWs and CSGWs,

Measurements from all the routers.

The IP transport resource information provided in the interface is for per logical interface (IP address range), per Traffic Class, and per IP BTS. There is no need to have any synchronized act-ions among IP BTSs and ITRM. ITRM will update the data conveyed in the admission control interface whenever is needed, and the 3GPP layer is expected to always use the latest information available in the interface.

Regarding notifications on available bandwidth or other QoS problems, the ITRM additionally provides directed feedback on available IP transport resources to 3GPP call control elements. Such information can be used for triggering handovers, for example. A scalable way of implementing this is inform 3GPP call control elements when predefined bandwidth levels (or other QoS triggers) are exceeded on bottleneck links from the BTS. Conversely, when trigger condition is no longer true, IP BTSs are again informed. Clearly, averaging is desirable to obtain hysteresis, for avoiding the risk of having oscillating system.

Figure 8:
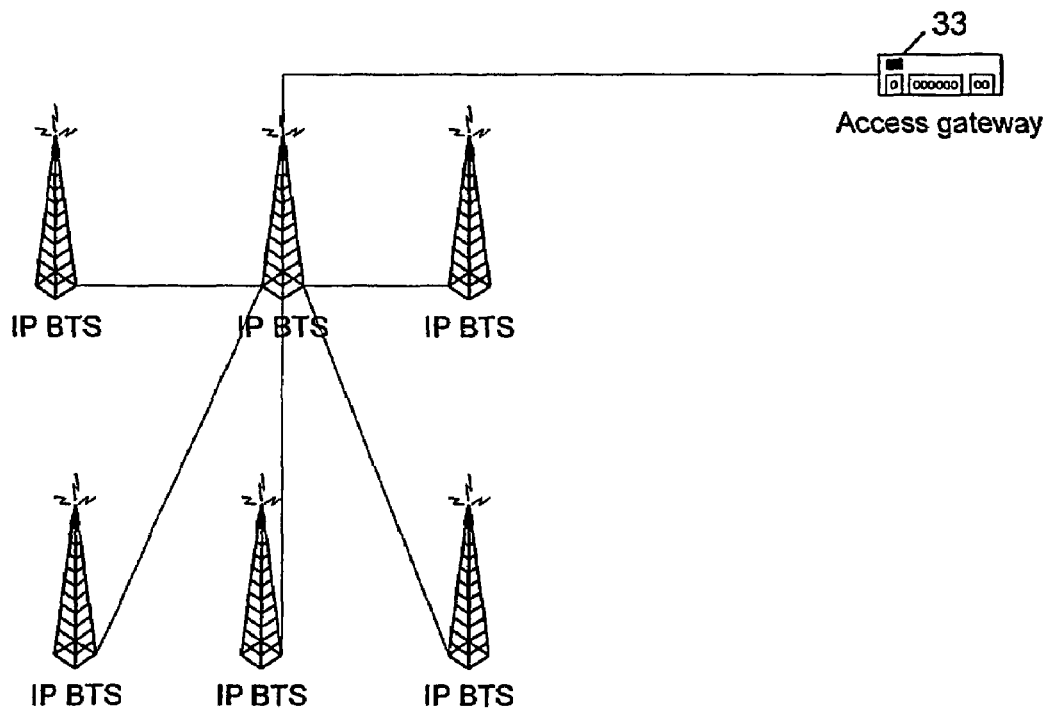
FIG. 8 shows an example architecture for available bandwidth notification, with all BTSs connected to a star point.

FIG. 8 shows an example architecture for available bandwidth notification between several IP BTSs connected to a star point, and an Access Gateway. The other components such as ITRM are not shown in FIG. 8.

For the example architecture shown in FIG. 8, all the IP BTSs connected to the star point as shown are notified of predefined QoS situation (e.g., available bandwidth smaller than X) taking place on the link from star point to access gateway 33.

Regarding IP transport resource information, preferably the most natural form of IP transport resource information is the available bandwidth expressed in terms of data per time unit, e.g. kbit/sec. The proposed interface may also carry some other information as optional or as replacing bandwidth information. Below some examples are given.

Information may be the carried load in % (e.g. utilization of the available link capacity).

Information may include delay parameters, or related usage of provided packet buffers (e.g. maximum or average filling of buffers for each queue), Information may include packet loss parameters, Information may be identification of predetermined classes. For example, 3GPP call control may ask "Is there enough resources for another Standard VoIP call". Notice that in this case there is no explicit bandwidth information transferred over the interface, Information may be a notification. For example, the 3GPP call control may simply send a notification about a new connection without any explicit parameters (not even a class). ITRM can respond based on worst case assumptions about the requirements of the new connection, Information may be a lack of notification. For example, as long as the 3GPP call control do not receive any alarm notification, it assumes the existence of enough IP transport resources. FIG. 9 illustrates an embodiment of a Radio Access Bearer Establishment procedure in accordance with the invention.

Between Step 3 and 4, RNAS selects RNGW and Iu' tunnel. Endpoint address of RNGW is known in the RAB assignment message of Step 4.

Checking the availability of IP transport resource preferably takes place as part of Step 5, at the time when the location of serving BSGW is determined (here both Endpoints of Iu' tunnel are known).

In the case direct or directed re-try is initiated, the procedure for serving IP BTS relocation is preferably followed. If serving BTS and drift BTS are different physical BTSs, then the interface capacity of both Iur tunnel and Iu' tunnel is preferably checked.

In the scenario shown in FIG. 9, it is supposed that the UE (user equipment) is in RRC connected mode, so an RRC connection has been previously established in dedicated mode. In case of GERAN, the TBF must be previously established. The message flows and steps shown in FIG. 9 are evident from the drawing providing clear disclosure thereof. In addition, some of the steps and features are described below with reference to the step numbering shown in FIG. 9.

Step 1: CN (Core Network) sends a RANAP RAB Assignment Request message to RNAS in order to setup a RAB establishment procedure.

Step 2: The RNAS selects the RNGW (RAN Gateway) used for the establishment of the RABs, and reserves the resources using one RGAP Reserve Identifier Request message.

Step 3: Once the resources (TEIDs) have been reserved in the RNGW, it responds to the RNAS using one RGAP Reserve Resources Identifier Response message.

Step 4: RNAS provides relay (changing some of the parameters involved) to the RANAP message received in step 1, sending it to the IP BTS using RANAP' RAB Assignment Request message. The RNAS knows which IP BTS to select because there is one mapping table UE identifier (IMSI)—UCF in the RNAS.

Step 5: UCF executes then UCF level admission control for the incoming RAB request, by receiving the load measurements from the target BSGW. UCF decides if it is possible to admit the RAB requested by the RAN.

Now, in case that directed retry is initiated, the IP BTS can ask the CRMS to change the cell before establishing the radio link for the new service.

Step 6: In UTRAN case, the serving IP BTS can ask for measurements to the UE by sending one RRC Measurement Control message.

Step 7: The UE sends measurements using UTRAN RRC Measurement Report. In case of GERAN, the UE sends periodically the RRC Measurement Report or Enhanced Measurement Report message.

Step 8: The IP BTS can ask now to the CRMS (Common Resource Management Server) to prioritize the candidate cell list sending the Prioritized Cell List Request message.

Step 9: The CRMS returns the candidate cell list using the Prioritized Cell List Response message.

After the priorization of the cell list, one IP BTS relocation procedure may be initiated if needed. Then, the RAB establishment procedure continues (in this case it is supposed that the cell chosen is the same where the RRC connection was established).

The user plane (BSGW) is reconfigured in case of UE in RRC dedicated state, and the radio link is also reconfigured.

Step 10: When both c-plane and u-plane are ready for the new RAB, the IP BTS sends a RRC Radio Bearer Setup message to UE. Notice that in case of GERAN, the TBF is needed.

Step 11: UE acknowledges the RB setup sending a RRC Radio Bearer Setup Complete message to the IP BTS.

Step 12: The IP BTS acknowledges the RAB assignment procedure sending a RANAP' RAB Assignment Response message to the RNAS.

Step 13: In the previous message, the RNAS receives the transport address and the TEID assigned by the BSGW for the establishment of the GTP tunnel. Now the RNAS sends these parameters to the RNGW in one RGAP Add Mapping Request message.

Step 14: The RNGW sends a RGAP Add Mapping Response message to RNAS.

Step 15: The RNAS relay this message to the CN in one RANAP RAB Assignment Response message.

While the invention has been described with reference to preferred embodiments, the description is illustrative of the invention and is not to be construed as limiting the invention. Various modifications and applications may occur to those skilled in the art without departing from the scope of the invention as e.g. defined by the appended claims.

The invention claimed is:

1. An apparatus, comprising:
a processor configured to
measure a traffic situation in an internet protocol-based communication network based on traffic situation data, wherein part of the traffic situation data is topology and routine data from a core internet protocol network and part of the traffic situation data is traffic load information from a radio network, and
control a traffic flow based upon the measured traffic situation from the core internet protocol network and the radio network, wherein
the processor is configured to transmit data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

2. An apparatus according to claim 1, wherein said processor is configured to measure one or more of a delay and a loss of transmitted data.

3. An apparatus according to claim 1, wherein said processor is configured to combine the measured topology and routing data and the measured traffic load information to obtain actual traffic situation data within each of a plurality of routing domains of a specific part of the network.

4. An apparatus according to claim 1, wherein a specific part of the network comprises a broker configured to provide the topology and routing data.

5. An apparatus according to claim 1, wherein said processor is configured to control an incoming traffic flow at gateways of said network towards a specific part of the network.

6. An apparatus according to claim 5, wherein said processor is configured to provide an allowed amount of traffic to each of a plurality of gateways and to set priorities for the traffic flow.

7. An apparatus according to claim 1, wherein the processor is further configured to provide rules, wherein said processor is configured to control a traffic flow based upon the provided rules.

8. An apparatus according to claim 7, wherein said processor is configured to provide rules for different measured traffic situations.

9. An apparatus according to claim 7, wherein the rules are set by an operator.

10. An apparatus according to claim 1, wherein the network comprises a transport part and a core part.

11. An apparatus according to claim 1, wherein feedback of an internet protocol transport network quality of service situation is provided for third generation partnership project connection admission control.

12. An apparatus according to claim 1, wherein the processor is further configured to provide internet protocol radio access network controlling admission control based on quality of service feedback from the network.

13. An apparatus according to claim 1, wherein
the apparatus is configured to present information on a bandwidth between internet protocol address ranges to a control layer so as to allow a call control to verity that a new microflow of bandwidth X of class Y can be admitted, and
the frame protocol frames are downlink shared channel frame protocol frames for data transmission on an interface between a radio network controller and a base station.

14. An apparatus according to claim 1, wherein the frames further comprise a medium access control indicating field that indicates a size of a medium access control service data unit.

15. An apparatus according to claim 1, wherein an internet protocol transport resource manager is provided that is configured to dynamically update bandwidth information for base transceiver stations.

16. An apparatus according to claim 1, further comprising at least one interface related to connection admission control, wherein the at least one interface, from which an internet protocol transport resource manager is configured to gain information, comprises at least one of:
a router notification interface,
a topology monitoring interface,
a simple network management protocol polling interface,
an interface towards radio network admission control, and
an interface towards a management system.

17. An apparatus according to claim 1, further comprising at least one interface related to connection admission control, wherein the at least one interface, to which an internet protocol transport resource manager is configured to output control information, comprises at least one of:
a differentiated services interface configured to facilitate configuration of one or more of differentiated services and multi-protocol label switching peta binary bits in internet protocol equipment, an admission control interface configured to provide connection admission control information towards at least one gateway, a quality of service notification interface configured to provide notifications of quality of service status changes in internet protocol transport, and a system management interface configured to facilitate system management.

18. An apparatus according to claim 17, wherein the at least one gateway comprises an internet protocol base transceiver station or a radio access network gateway.

19. An apparatus according to claim 1, further comprising:
an internet protocol transport resource manager configured to provide central internet protocol transport bandwidth management, bandwidth control, differentiated services tuning, and report storage, wherein the internet protocol transport resource manager is further configured to provide topology, routing and bookkeeping.

20. An apparatus according to claim 19, wherein, to perform the bookkeeping, the internet protocol transport resource manager is configured to receive, from the central internet protocol transport bandwidth manager, traffic load information per a differentiated services code point related to traffic load from each of a plurality of monitored gateways to other monitored gateways and quality of service level information, and provide a notification when traffic between some gateways exceeds a predetermined threshold range.

21. An apparatus according to claim 20, wherein quality of service level information comprises loss and delay information.

22. An apparatus according to claim 19, wherein, to perform bandwidth control, the internet protocol transport resource manager is configured to receive measurement report information corresponding to measured values and use information on. the bandwidth (in bits per second) and information on code point sharing for the gateways.

23. An apparatus according to claim 19, wherein the internet protocol transport resource manager is configured to send measurement information to the differentiated services tuner and to a policy manager, wherein the policy manager is configured to define target values of the bandwidth to be used depending on a set threshold range and an area to be served by network equipment and inform the bandwidth control of the set target values.

24. An apparatus according to claim 23, wherein the equipment comprises a gateway or network.

25. An apparatus according to claim 1, wherein the traffic flow is an incoming traffic flow.

26. An apparatus according to claim 1, wherein the internet protocol-based communications network comprises an internet protocol-based mobile network.

27. An apparatus according to claim 1, wherein the bandwidth between internet protocol address ranges comprises internet protocol host address ranges of gateways between a base transceiver station and a gateway site.

28. An apparatus according to claim 1, wherein the call control comprises a third generation partnership project call control.

29. A method, comprising:
measuring a traffic situation in an internet protocol-based communication network based on traffic situation data, wherein part of the traffic situation data is topology and routing data from a core internet protocol network and part of the traffic situation data is traffic load information from a radio network; and controlling a traffic flow on the basis of the measured traffic situation from the core internet protocol network and the radio network, wherein data is transmitted via frame protocol frames on an interface between a radio network controller and a base station, wherein the frames comprise information to support flow control between the radio network controller and the base station or a node B, and the frames comprise at least one of
an identifying field that identifies a number of a medium access control high speed data unit in the frame, an indicating field that indicates a buffer status of one or more radio network controller buffers and informs the base station or node B how much data belonging to the same traffic flow is still left in the radio network controller, a containing field that contains a user equipment identity type and a common transport channel priority indicator, and a buffer data indicating field that indicates a number of radio network controller buffers from which data has been applied into the frame.

30. A method according to claim 29, wherein the measuring of the traffic situation comprises one or more of measuring a delay and a loss of transmitted data.

31. A method according to claim 29, wherein the measuring of the traffic situation comprises combining the measured topology and routing data and the measured traffic load information to obtain actual traffic situation data within each of a plurality of routing domains of a specific part of the network.

32. A method according to claim 29, wherein said controlling of the traffic flow comprises controlling incoming traffic flow at gateways of said network towards a specific part of the network.

33. A method according to claim 32, wherein said controlling of the traffic flow comprises providing to each gateway an allowed amount of traffic and priorities to be set for the traffic flow.

34. A method according to claim 29, further comprising:
providing rules to control traffic flow, wherein controlling traffic flow comprises controlling a traffic flow based upon the provided rules.

35. A method according to claim 34, wherein the rules are provided for different measured traffic situations.

36. A method according to claim 29, wherein the network comprises a transport part and a core part.

37. A method according to claim 29, wherein feedback of an internet protocol transport network quality of service situation is provided for third generation partnership project connection admission control.

38. A method according to claim 29, comprising an internet protocol radio access network controlling admission control based on quality of service feedback from the network.

39. A method according to claim 29, wherein
information on a bandwidth between internet protocol address ranges is presented to a control layer so as to allow a call control to verify that a new microflow of bandwidth X of class Y can be admitted, and the frame protocol frames are downlink shared channel frame protocol frames for data transmission on an interface between a radio network controller and a base station.

40. A method according to claim 29, further comprising:
indicating a size of a medium access control service data unit.

41. A method according to claim 29, further comprising:
dynamically updating bandwidth information for base transceiver stations.

42. A method according to claim 29, further comprising:
providing connection admission control, wherein interfaces from which an internet protocol transport resource manager gains information comprise at least one of
a router notification interface,
a topology monitoring interface,
a simple network management protocol polling interface,
an interface towards radio network admission control, and
an interface towards a management system.

43. A method according to claim 29, further comprising:
providing connection admission control, wherein interfaces, to which an internet protocol transport resource manager is configured to output control information, perform at least one of
facilitating configuration of differentiated services and/or multi-protocol label switching peta binary bits,
providing connection admission control information towards at least one gateway,
providing notifications of quality of service status changes in internet protocol transport, and
facilitating system management.

44. The method according to claim 43, wherein the at least one gateway comprises an internet protocol base transceiver station or a radio access network gateway.

45. A method according to claim 29, further comprising:
managing internet protocol transport bandwidth, controlling bandwidth, tuning differentiated services, storing a report, and performing topology, routing and bookkeeping functions.

46. A method according to claim 45, wherein the bookkeeping comprises receiving the traffic load information per a differentiated services code point related to traffic load from each of a plurality of monitored gateways to other monitored gateways and quality of service level information, and providing a notification when traffic between some gateways exceeds a predetermined threshold range.

47. The method according to claim 46, wherein the bookkeeping is performed by a gateway or network.

48. A method according to claim 45, wherein the controlling of the bandwidth comprises receiving measurement report information corresponding to measured values and using information on the bandwidth (in bits per second) and information on code point sharing for the gateways.

49. A method according to claim 45, wherein measurement information is used to define target values of the bandwidth to be used depending on a set threshold range and an area to be served and controlling the bandwidth based on the set target values.

50. The method according to claim 49, wherein the measurement information is used by a gateway or network.

51. A method according to claim 29, wherein the traffic flow comprises an incoming traffic flow.

52. A method according to claim 29, wherein the internet protocol-based communications network comprises an internet protocol-based mobile network.

53. The method according to claim 29, wherein a bandwidth between internet protocol address, ranges comprises internet protocol host address ranges of gateways between a base transceiver station and a gateway site.

54. The method according to claim 29, wherein the call control comprises a third generation partnership project call control.

55. An apparatus, comprising:
a processor configured to measure traffic situation data in an internet protocol-based communication network, wherein part of the traffic situation data is topology and routing data from a core internet protocol network and part of the traffic situation data is traffic load information from a radio network, and wherein the processor is configured to use measured traffic situation data from the core internet protocol network and the radio network to control traffic flow, wherein
the processor is configured to transmit data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

56. An apparatus according to claim 55, wherein the processor is configured to measure one or more of a delay and a loss of transmitted data.

57. An apparatus according to claim 55, wherein the processor is configured to combine the measured topology and routing data and the measured traffic load information to obtain traffic situation data for a specific part of the network.

58. An apparatus according to claim 55, wherein the processor is configured to combine the measured topology and routing data and the measured traffic load information to obtain actual traffic situation data within each of a plurality of routing domains of a specific part of the network.

59. An apparatus, comprising:
a processor configured to control traffic flow based upon traffic situation data measured in an internet protocol-based communication network, wherein part of the traffic situation data is topology and routing data from a core internet protocol network and part of the traffic situation data is traffic load information from a radio network, wherein
the processor is configured to transmit data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and a buffer data indicating field that indicates a number of radio network controller buffers from which data has been applied into the frame.

60. An apparatus according to claim 59, wherein the processor is configured to control an incoming traffic flow at gateways of the network towards a specific part of the network.

61. An apparatus according to claim 59, wherein the processor is configured to provide an allowed amount of traffic to each of a plurality of gateways and to set priorities for the traffic flow.

62. An apparatus, comprising:
a processor configured to provide rules for traffic situations measured in an internet protocol-based communication network to control traffic flow on the basis of the provided rules, wherein the rules are based on traffic situation data, part of the traffic situation data is topology and routine data from a core internet protocol network and part of the traffic situation data is traffic load information from a radio network, and wherein
the processor is configured to transmit data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

63. An apparatus according to claim 62, wherein the traffic flow comprises an incoming traffic flow.

64. An apparatus, comprising:
measuring means for measuring a traffic situation in an internet protocol-based communication network based on traffic situation data, wherein part of the traffic situation data is topology and routing data from a core internet protocol network and part of the traffic situation data is traffic load information from a radio network;
controlling means for controlling traffic flow on the basis of the measured traffic situation from the core internet protocol network and the radio network; and
transmitting means for transmitting data via frame protocol frames on an interface between a radio network controller and a base station, wherein
the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

65. A method, comprising:
measuring traffic situation data in an internet protocol-based communication network, wherein part of the traffic situation data is topology and routing data from a core internet protocol network and part of the traffic situation data is traffic load information from a radio network;
using the measured traffic situation data from the core internet protocol network and the radio network to control traffic flow; and
transmitting data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

66. A method according to claim 65, wherein the measuring further comprises one or more of measuring a delay and a loss of transmitted data.

67. A method according to claim 65, further comprising:
combining the measured topology and routing data and the measured traffic load information to obtain actual traffic situation data within each of a plurality of routing domains of a specific part of the network.

68. A method, comprising:
controlling traffic flow based upon traffic situation data measured in an internet protocol-based communication network, wherein part of the traffic situation data is topology and routing data from a core internet protocol network and part of the traffic situation data is traffic load information from a radio network; and
transmitting data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and a buffer data indicating field that indicates a number of radio network controller buffers from which data has been applied into the frame.

69. A method according to claim 68, wherein the controlling further comprises controlling an incoming traffic flow at gateways of the network towards a specific part of the network.

70. A method according to claim 68, further comprising:
providing an allowed amount of traffic to each of a plurality of gateways; and
setting priorities for the traffic flow.

71. A method, comprising:
providing rules for measuring traffic situations in an internet protocol-based communication network, wherein the rules are based on traffic situation data, part of the traffic situation data is topology and routing data from a core internet protocol network and part of the traffic situation data is traffic load information from a radio network;
controlling traffic flow on the basis of the provided rules; and
transmitting data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

72. A method according to claim 71, wherein the traffic flow comprises an incoming traffic flow.

73. A computer program embodied on a computer readable storage medium, the program configured to control a processor to perform a process, the process comprising:
measuring traffic a situation in an internet protocol-based communication network based on traffic situation data, wherein part of the traffic situation data is topology and routing data from a core internet protocol network and part of the traffic situation data is traffic load information from a radio network;
controlling a traffic flow on the basis of the measured traffic situation from the core internet protocol network and the radio network; and
transmitting data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

74. A computer program embodied on a computer readable storage medium, the program configured to control a processor to perform a process, the process comprising:
measuring traffic situation data in an internet protocol-based communication network, wherein part of the traffic situation data is topology and routing data from a core internet protocol network and part of the traffic situation data is traffic load information from a radio network;
using the measured traffic situation data from the core internet protocol network and the radio network to control traffic flow; and
transmitting data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

75. A computer program embodied on a computer readable storage medium, the program configured to control a processor to perform a process, the process comprising:
controlling traffic flow based upon traffic situation data measured in an internet protocol-based communication network, wherein part of the traffic situation data is topology and routing data from a core internet protocol network and part of the traffic situation data is traffic load information from a radio network; and
transmitting data via frame protocol frames on an interface between a radio network controller and a base station, wherein the frames comprise information to support flow control between the radio network controller and the base station or a node B, and
the frames comprise at least one of
an identifying field that identifies a number of a medium access control high speed data unit in the frame,
an indicating field that indicates a buffer status of one or more radio network controller buffers and informs the base station or node B how much data belonging to the same traffic flow is still left in the radio network controller,
a containing field that contains a user equipment identity type and a common transport channel priority indicator, and
a buffer data indicating field that indicates a number of radio network controller buffers from which data has been applied into the frame.

76. A computer program embodied on a computer readable storage medium, the program configured to control a processor to perform a process, the process comprising:

providing rules for measuring traffic situations in an internet protocol-based communication network, wherein the rules are based on traffic situation data, part of the traffic situation data is topology and routing data from a core internet protocol network and part of the traffic situation data is traffic load information from a radio network;

controlling traffic flow on the basis of the provided rules; and transmitting data via frame protocol frames on an interface between a radio network controller and a base station, wherein the frames comprise information to support flow control between the radio network controller and the base station or a node B, and the frames comprise at least one of
- an identifying field that identifies a number of a medium access control high speed data unit in the frame,
- an indicating field that indicates a buffer status of one or more radio network controller buffers and informs the base station or node B how much data belonging to the same traffic flow is still left in the radio network controller,
- a containing field that contains a user equipment identity type and a common transport channel priority indicator, and
- a buffer data indicating field that indicates a number of radio network controller buffers from which data has been applied into the frame.

* * * * *

UNITED STATES PATENT AND TRADEMARK OFFICE
CERTIFICATE OF CORRECTION

PATENT NO.       : 7,626,932 B2                                       Page 1 of 1
APPLICATION NO.  : 10/499002
DATED            : December 1, 2009
INVENTOR(S)      : Tuulos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Second Day of November, 2010

David J. Kappos
*Director of the United States Patent and Trademark Office*